March 31, 1970  J. GRZELAK ET AL  3,503,662
DEVICE FOR OPTICAL MICROSCOPE TRANSFORMATION INTO
A POLARIZING INTERFEROMETER MICROSCOPE
Filed May 5, 1965  2 Sheets-Sheet 1

INVENTORS
JERZY GRZELAK
JANUSZ JOZEF CHALECKI

BY Larson and Taylor
ATTORNEYS

March 31, 1970   J. GRZELAK ET AL   3,503,662
DEVICE FOR OPTICAL MICROSCOPE TRANSFORMATION INTO
A POLARIZING INTERFEROMETER MICROSCOPE
Filed May 5, 1965                      2 Sheets-Sheet 2

INVENTORS
JERZY GRZELAK
JANUSZ JOZEF CHALECKI

BY Larson and Taylor
ATTORNEYS

# United States Patent Office 3,503,662
Patented Mar. 31, 1970

3,503,662
DEVICE FOR OPTICAL MICROSCOPE TRANSFORMATION INTO A POLARIZING INTERFEROMETER MICROSCOPE
Jerzy Grzelak, Pustelnicka St. 8a m. 6, and Janusz Józef Chalecki, Grochowska St. 54 m. 28, both of Warsaw, Poland
Filed May 5, 1965, Ser. No. 453,268
Claims priority, application Poland, May 7, 1964, P 104,494
Int. Cl. G02b 21/06, 21/14; G02f 1/24
U.S. Cl. 350—12      7 Claims

ABSTRACT OF THE DISCLOSURE

A conventional optical microscope is changed into a polarizing-interference microscope by the addition of an interference head attachment between the microscope head and ocular lens; a condenser is provided below the microscope stage.

---

Figures 1, 1A:
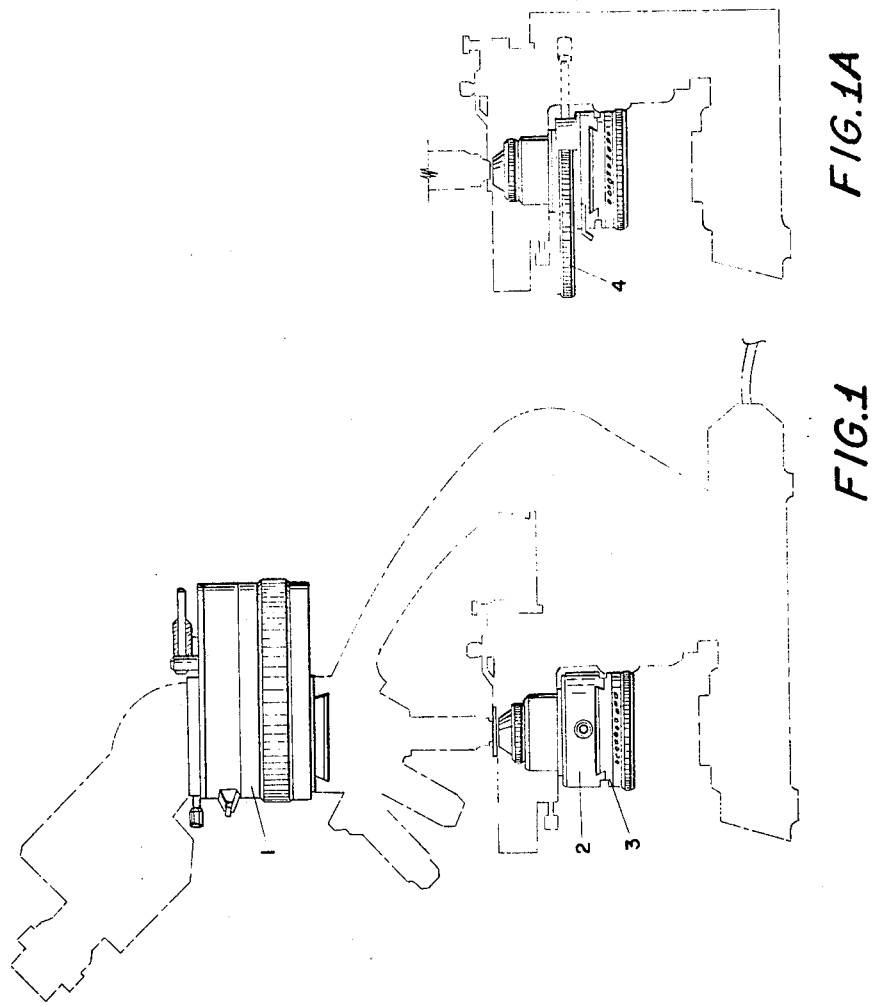

An object of the present invention is the transformation of an optical microscope into a polarizing-interference microscope by the addition of a polarizing interference device whose component parts are: an interference head and either a condenser with slot or a condenser with compensators. The thus constructed polarizing interference microscope is intended for qualitative and quantitative examination of light absorbing preparations (amplitude type) as well as of almost fully transparent preparations (phase type). From among many quantitative examinations which the invention microscope facilitates, it is important to mention the following: measurements of optical path difference and index of refraction, determination of dry mass content in biological cells and their fragments, measurements of birefringence, solution concentration, microsurface shape etc.

Hitherto known polarizing-interference microscopes are highly complicated in comparison with an ordinary biological microscope. Moreover, they are rather inconvenient in use because of the necessity to exchange some elements when changing the method of examination. When making use of these microscopes as an ordinary biological microscope with illumination in the so called "bright field," their complicated optical and mechanical constructions cause difficulties in operation.

All the above noted defects may be eliminated by the application of the present invention. When mounting the polarizing-interference device into an ordinary biological microscope, a polarizing-interference microscope is obtained highly exceeding hitherto known microscopes of this type in operational efficiency and in ease of service.

The mounting of the device into the microscope is simple and no more troublesome then the mounting of typical equipment such as a photographic annex or a phase contrast device.

An interference head comprising a set of birefringent prisms and an analyser is the main part of the invention device. Further elements are a condenser with slot, a condenser with compensators and an adjusting telescope.

The prisms mounting into the interference head enables:

(a) Prisms switching over in dependence on the kind of measurement or examination method to be used, (b) Vertical shift in order to position the prism in proper relation to the objective focal plane, (c) Horizontal shift in order to perform the measurements, (d) Independent inclination of each prism when adjusting the head.

The invention polarizing-interference device enables the biological microscope user to apply interference methods of examination and no special microscope purchasing is necessary. This possibility has an essential influence on the decrease of investment costs of laboratories where a microscope used for ordinary serial examinations can be adapted within a short time to modern methods of interference research.

Figure 2:
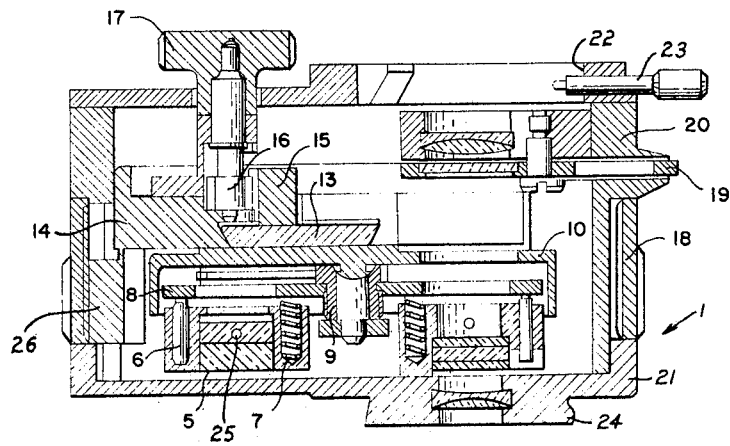
Figure 3:
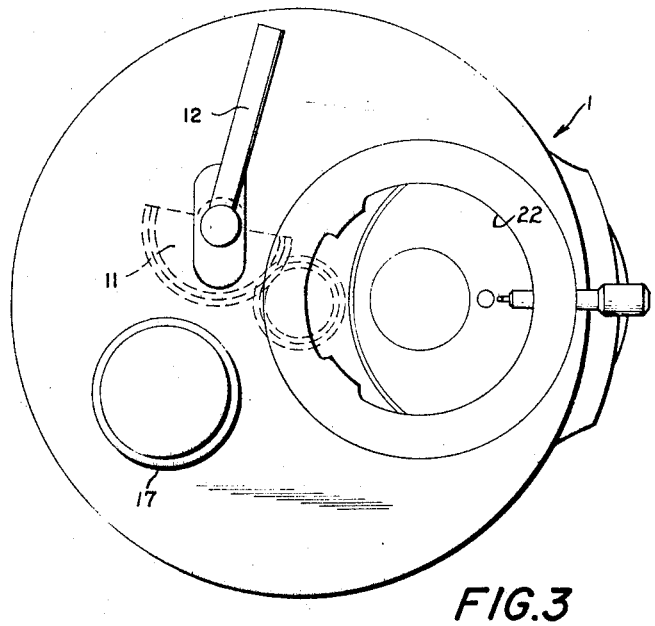

The present invention is shown by way of example in the drawing, where:

FIG. 1 shows a schematic view of a biological microscope with a mounted polarizing-interference device, FIG. 1A shows the lower part of a microscope with a condenser with compensators, FIG. 2 shows a section through the interference head, FIG. 3 shows the top view of the head.

Interference heat 1 is mounted between the microscope head and the diocular attachment (or single ocular). Condenser 2 with slot is located in the place of a normal microscope condenser. The lower part of the condenser is provided with slides on which polarizer 3 is mounted. The polarizer may revolve through 360°. The condenser 2 with slot may be replaced with condenser 4 with compensators, as shown in FIG. 1A, thus creating optimal conditions of illumination at qualitative observations.

As shown in FIG. 2, the interference head 1 comprises a housing 21 including a receiving opening 22 with lock element 23 in the upper part, and a boss 24 depending from the lower part, and in line with opening 22. The opening 22 and boss 24 enable the interference head 1 to be readily attached to the head and ocular lens of a conventional microscope. Three birefringent prisms 5 are in the interference head (FIG. 2) glued into mountings. Each mounting is provided with an axle 25. In a plane perpendicular to the prism axis, in each mounting, a screw 6 is placed at one side and spiral spring 7 is placed on the other side of the prism. This screw-spring arrangement permits the inclination of the prism by an angle of approx. 3°, by turning the screw 6. The three mountings are carried by their axles 2 on a rotatable disc 8. They are located on the periphery every 90°. A free opening is left on one place on the periphery of disc 8.

Sleeve 9 provided with a gear on the top part is connected permanently with disc 8. This sleeve 9 forms a bearing enabling disc 8 to rotate in relation to element 10. Disc 8 is equipped with a ratchet and pawl device engaged in a notch on element 10 in order to stabilize the position of prisms and of the free opening in relation to the microscope optical axis. Changing over the prisms is achieved by means of the gear transmission formed by sleeve 9 and gear 11 whose vertical axle is equipped with lever 12 (see FIG. 3) above the head top surface.

Dovetail slide 13 is fixed to carrier element 10 and is moveable in a dovetail groove made in support part 14. Toothed bar 15 is fixed to the dovetail, being engaged with a gear 16 whose bearings are placed in support part 14. Gear 16 axle is provided with knurled wheel 17 above the head top surface. Rotation of knob 17 shifts slide 13, carrier element 10, disc 8 and prisms 5 in a plane perpendicular to the microscope optical axis.

Three segments 26 provided with an external thread extend downwardly near the bottom of support part 14. Said segments 26 are engaged with the internal thread of a rotatable knurled ring 18. Ring 18, when rotated, causes a vertical shifting of support part 14 and of prisms 5 carried by this part.

An analyzer 19 in a mounting fixed with housing part 20 is placed above part 14. The analyzer mounting may revolve through 360°. The analyzer occupies one-half of the mounting only and, a free opening is in the other half.

Free openings in disc 8 and in the analyzer mounting enable a quick change-over from interference methods to "bright field" observations.

What we claim is:

1. For use with an optical microscope including an objective head, ocular lens and a stage in series along an optical path, an interference head comprising plural birefringent prisms and including means for mounting said interference head between said objective head and said ocular lens, and a condenser mounted below said stage, whereby a conventional optical microscope is converted into an interference microscope when said head and a condenser are mounted thereonto.

2. The subject matter of claim 1 wherein said interference head comprises means for selectively positioning one of said prisms in the interference head optical path.

3. The subject matter of claim 2, wherein said interference head further comprises means for shifting a prism located in the optical path through said head transversely to said optical path.

4. The subject matter of claim 3 wherein said interference head further includes means for shifting a prism in said optical path along said optical path.

5. The subject matter of claim 1, said condenser means comprising a polarizer, and said interference head comprising an analyzer.

6. The subject matter of claim 1, wherein said interference head includes a housing, a rotatable disc carrying said prisms, means for selectively rotating said disc, means including a rack supporting said disc, said rack extending transversely of the optical path through said interference head, and a gear meshing with said rack for shifting said disc and prisms transversely of said optical path.

7. The subject matter of claim 6, said interference head further including a support for said disc including thread-bearing means, and means accessible from the exterior of said housing and engaging the threads of said thread-bearing means for moving said support and disc along said optical path.

References Cited

UNITED STATES PATENTS 2,565,419   8/1951   Aitcheson _____ 350—12

FOREIGN PATENTS 444,163   7/1912   France.
1,303,356   7/1962   France.

DAVID SCHONBERG, Primary Examiner

PAUL R. MILLER, Assistant Examiner

U.S. Cl. X.R.

350—13, 14, 88, 157, 159